March 2, 1926.
C. T. HIXSON
1,574,888
ATTACHMENT FOR HEADLIGHTS
Filed June 30, 1924
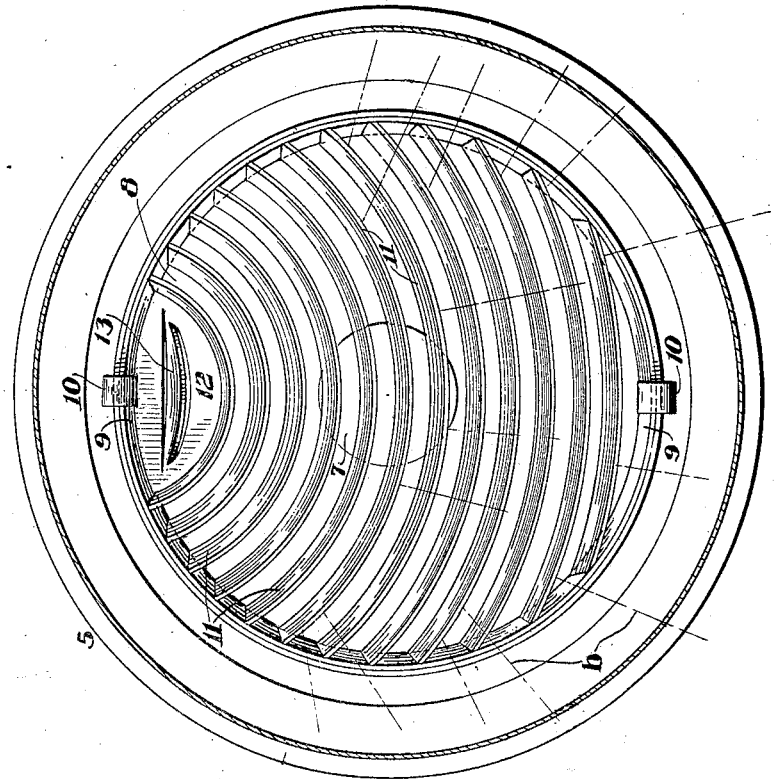
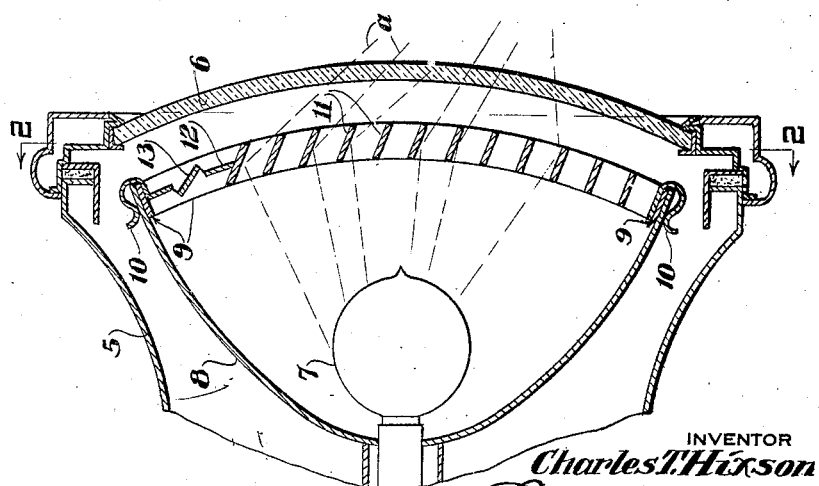
WITNESSES
*Louis Goodman*
*E. N. Lovewell*
INVENTOR
*Charles T. Hixson*
BY
ATTORNEY Patented Mar. 2, 1926.

1,574,888

UNITED STATES PATENT OFFICE.

CHARLES T. HIXSON, OF AZTEC, NEW MEXICO, ASSIGNOR OF ONE-THIRD TO WILLIAM UTTON, OF AZTEC, NEW MEXICO, AND ONE-THIRD TO WILLIARD W. CAMPBELL, OF ALBUQUERQUE, NEW MEXICO.

ATTACHMENT FOR HEADLIGHTS.

Application filed June 30, 1924. Serial No. 723,307.

*To all whom it may concern:*

Be it known that I, CHARLES T. HIXSON, a citizen of the United States, residing at Aztec, in the county of San Juan and State of New Mexico, have invented a new and useful Attachment for Headlights, of which the following is a specification.

This invention relates to an attachment for headlights, designed particularly for use in connection with automobiles for preventing the blinding glare which is caused by headlights of the ordinary construction.

The general object of the present invention is to provide a device adapted to be attached to a headlight of the ordinary construction, and which will insure proper illumination of the roadway for some distance in front of the vehicle and at each side thereof, while preventing the concentration of light rays in any one direction, and substantially preventing any direct rays from being projected at such an angle as to blind the driver of any vehicle approaching from the opposite direction.

The attachment is so constructed that it may be readily secured within the rim of the reflector in the regulation headlight and just as readily removed, and it may be manufactured and sold for a small sum. The invention is preferably manufactured from metal, and includes a substantially circular rim conforming to the rim of the reflector. Extending from side to side of this rim, and secured thereto by soldering or other suitable means are a series of spaced arcuate blades disposed with their convex faces downward and sloping upwardly and rearwardly so as to deflect the rays of light downward toward the surface of the roadway, and at the same time disperse them laterally, so that the driver of a vehicle approaching from the opposite direction may see the surrounding objects clearly without being annoyed or blinded by the direct rays from the headlight.

The construction of the invention and the principles of its operation will be more clearly understood from the following detailed description taken in connection with the accompanying drawing, which illustrates the invention in its preferred form.

In the drawing:

Figure 1 is a vertical longitudinal section of the invention as it appears when installed.

Figure 2 is a front elevation of the invention as viewed from the line 2—2 of Figure 1.

The invention as shown is adapted to be installed within a headlight housing 5 having an ordinary glass lens 6, and enclosing an electric light 7, in rear of which is the usual reflector 8.

The attachment, which constitutes the subject matter of the present invention, comprises a circular rim 9 adapted to fit within the rim of the reflector 8, and secured thereto by clips 10, or other suitable means. A series of arcuate blades 11 extend from side to side of the attachment, and have their ends secured to opposite sides of the rim 9 by solder or other suitable means. The several blades 11 are spaced apart at substantially equal distances, with their convex faces disposed downwardly, and with their centers located somewhat above the upper edge of the rim 9. The faces of the blades 11 slope rearwardly and upwardly at substantially the same angle as the lower side of the reflector 8, so that the rays of light emitted from the light bulb 7, for the most part, strike the under or convex faces of the blades 11, and are deflected downwardly as indicated by the broken lines *a* in Figure 1. The space between the uppermost blade 11 and the uppermost part of the rim 9 may conveniently be closed by a metallic sheet 12, having a strip struck therefrom, as shown at 13, and disposed so as to deflect the rays downwardly in the same manner as the blades 11.

In addition to the downward deflection of the rays of light which strike the under faces of the blades 11, these rays will be dispersed laterally, as indicated by the broken lines *b* in Figure 2. Owing to the convexity of the under faces of the blades and to their inclination, the roadway immediately in front of the vehicle and at both sides thereof is fully illuminated, while a sufficient proportion of the light rays pass between the blades without deflection to enable the driver of the vehicle to see the roadway ahead, and yet the driver of a vehicle approaching from the other direction will not be blinded. At the same time, the sides of the roadway will be plainly illuminated, so as to enable the drivers to pass each other as safely as in the daytime. By the use of this attachment, therefore, a brighter light will be shown on the road than when the usual dimmers or glare protectors are used. It puts the light on the road where it is needed, making the outlines of the automobile clearly visible, but absolutely prevents any glare to the approaching driver, and makes driving safe.

While I have shown and described specifically the preferred form of the invention, it will, of course, be obvious that the shape and arrangement of the various parts may be modified in different ways without any material departure from the essential principles of the invention. It is my intention, therefore, to include all such modifications within the scope of the appended claims.

What is claimed is:

1. An attachment for headlights comprising a metallic rim fitting closely within the rim of the headlight reflector and having a series of similarly disposed arcuate blades extending from side to side thereof and secured thereto, clips connected with said metallic rim and engageable over the edge of the reflector rim in front of the light to removably secure the attachment in such a position that the convex faces of the blades are disposed downwardly and slope upwardly and rearwardly, so that the rays of light will be reflected downwardly and dispersed laterally.

2. An attachment for headlights comprising a rim adapted to fit closely within the rim of the headlight reflector inside the lens and provided with clips for detachably engaging over the edge of the reflector rim, and a series of arcuate blades extending from side to side of the attachment and secured to the rim thereof, the centers of curvature of said blades being above the upper edge of the attachment, the faces of said blades sloping rearwardly and upwardly so that the rays of light will be reflected downwardly and dispersed laterally, and a metallic sheet covering the space between the uppermost arcuate blade and the rim of the attachment and having a straight blade struck therefrom and turned at such an angle as to deflect downwardly the rays which strike the same.

In testimony, that I claim the foregoing as my own, I have hereto affixed my signature.

CHARLES T. HIXSON.